(12) United States Patent
Miyashita

(10) Patent No.: US 9,221,412 B2
(45) Date of Patent: Dec. 29, 2015

(54) FRONT VEHICLE BODY STRUCTURE

(71) Applicant: TOYOTA JIDOSHA KABUSHIKI KAISHA, Toyota-shi (JP)

(72) Inventor: Toshiya Miyashita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/332,073

(22) Filed: Jul. 15, 2014

(65) Prior Publication Data

US 2014/0327254 A1 Nov. 6, 2014

Related U.S. Application Data

(62) Division of application No. 13/712,402, filed on Dec. 12, 2012, now Pat. No. 8,801,083.

(30) Foreign Application Priority Data

Dec. 13, 2011 (JP) .................................. 2011-272639

(51) Int. Cl.
*B60R 19/34* (2006.01)
*B62D 21/15* (2006.01)
*B60R 19/18* (2006.01)

(52) U.S. Cl.
CPC ................. *B60R 19/34* (2013.01); *B60R 19/18* (2013.01); *B62D 21/152* (2013.01); *B60R 2019/182* (2013.01)

(58) Field of Classification Search
CPC ................... B60G 2200/142; B60G 2204/143; B60G 2204/4302; B60G 2206/016; B60G 2206/122; B60G 7/02; B60K 11/04; B60S 1/50; B62D 21/15; B62D 21/152; B62D 21/04; B62D 21/155

USPC .......... 296/187.1, 187.09, 204; 293/110, 120; 280/784, 781

See application file for complete search history.

(56) References Cited

U.S. PATENT DOCUMENTS 3,881,742 A * 5/1975 Felzer ........................... 280/784
6,318,775 B1 11/2001 Heatherington et al.
(Continued)

FOREIGN PATENT DOCUMENTS

| JP | 7-25357 | 1/1995 |
| JP | 2001-88633 | 4/2001 |

(Continued)

OTHER PUBLICATIONS

Combined Chinese Office Action and Search Report issued Oct. 10, 2014 in Patent Application No. 201210540261.3 with English Translation.

*Primary Examiner* — Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A front vehicle body structure includes: a front side member that is arranged on a side portion of a front vehicle body longitudinally in a vehicle front-rear direction; a bumper reinforcement that is arranged longitudinally in a vehicle width direction, that is connected directly or indirectly to a front end of the front side member, and that includes a protruding portion that protrudes more outward in the vehicle width direction than the front side member; and a high-strength member that is formed with a higher strength than the protruding portion, that is mounted to a rear-surface side of the protruding portion, and that is formed such that a dimension in the vehicle front-rear direction is increased as the high-strength member extends more outward in the vehicle width direction.

6 Claims, 6 Drawing Sheets

(56) References Cited

U.S. PATENT DOCUMENTS

| | | | |
|---|---|---|---|
| 6,511,119 B2 * | 1/2003 | Takase et al. | 296/187.09 |
| 6,733,055 B2 | 5/2004 | Iino | |
| 6,866,115 B2 | 3/2005 | Miyasaka | |
| 6,994,374 B2 * | 2/2006 | Miyasaka | 280/784 |
| 7,469,956 B2 | 12/2008 | Yasuhara et al. | |
| 7,552,955 B2 | 6/2009 | Evans | |
| 7,931,318 B2 | 4/2011 | Matsumura | |
| 8,118,349 B2 | 2/2012 | Kihara et al. | |
| 8,287,013 B2 | 10/2012 | Kano et al. | |
| 8,348,333 B2 | 1/2013 | Iammarino et al. | |
| 8,454,080 B2 | 6/2013 | Qu et al. | |
| 8,485,592 B2 | 7/2013 | Shin et al. | |
| 8,496,287 B2 | 7/2013 | Matsuura et al. | |
| 8,505,990 B2 | 8/2013 | Czopek et al. | |
| 8,596,711 B2 | 12/2013 | Yasui et al. | |
| 2002/0008375 A1 * | 1/2002 | Iyanagi et al. | 280/784 |
| 2003/0090099 A1 | 5/2003 | Miyasaka | |
| 2003/0141712 A1 | 7/2003 | Miyasaka | |
| 2008/0296918 A1 | 12/2008 | Mueller et al. | |
| 2010/0127519 A1 | 5/2010 | Wakabayashi et al. | |
| 2012/0248819 A1 | 10/2012 | Okamura et al. | |
| 2013/0241233 A1 | 9/2013 | Ohnaka et al. | |

FOREIGN PATENT DOCUMENTS

| | | |
|---|---|---|
| JP | 2002-249079 | 9/2002 |
| JP | 2003-146246 | 5/2003 |
| JP | 2004-123027 | 4/2004 |
| JP | 2005-67347 | 3/2005 |
| JP | 2005-119537 | 5/2005 |
| JP | 2006-103591 | 4/2006 |
| JP | 2006-224728 A | 8/2006 |
| JP | 2007-500651 | 1/2007 |
| JP | 2008-213739 | 9/2008 |
| JP | 2009-35233 | 2/2009 |
| JP | 2010-132122 | 6/2010 |
| JP | 2012-71783 | 4/2012 |
| JP | 2013-123957 A | 6/2013 |

* cited by examiner

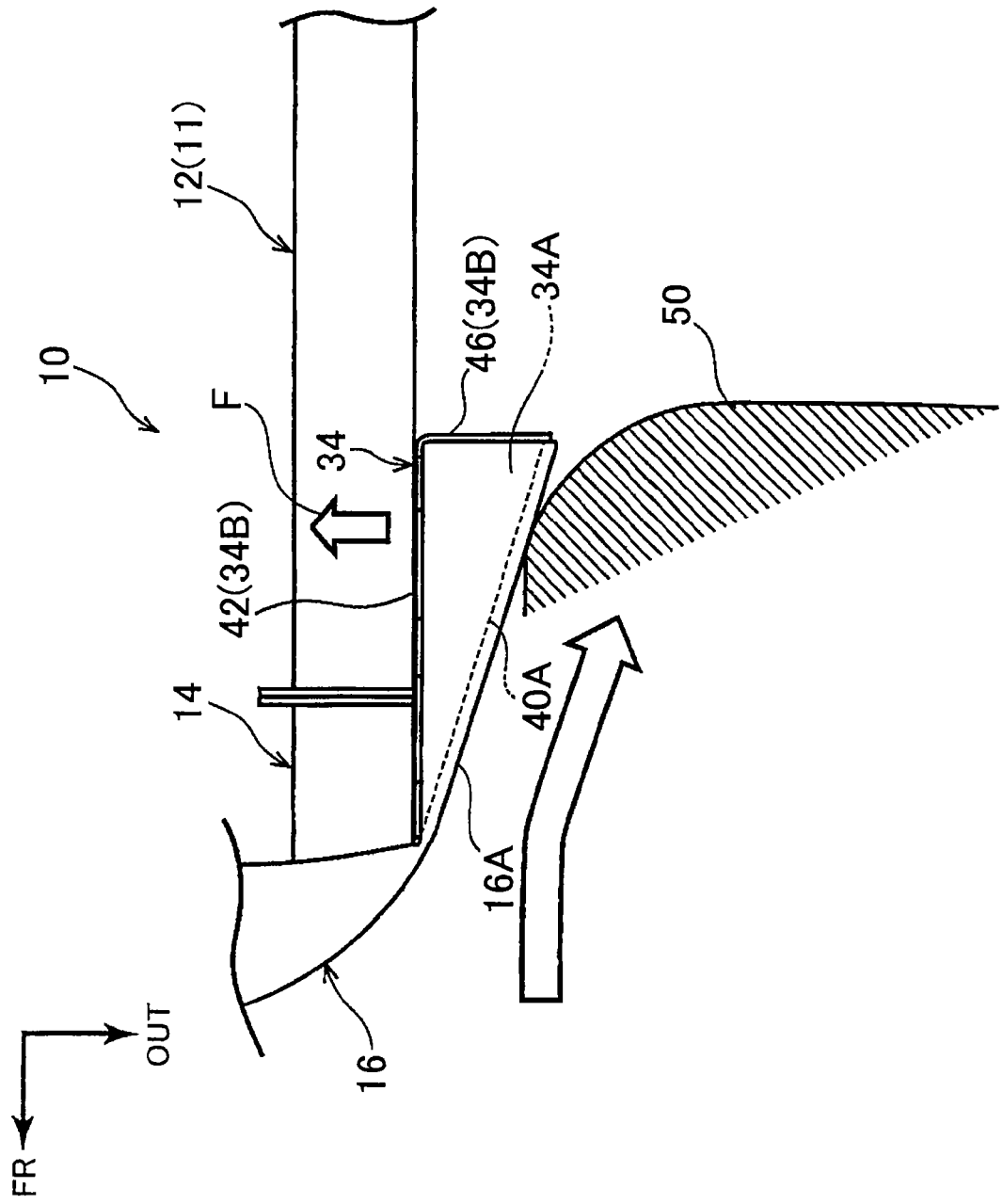

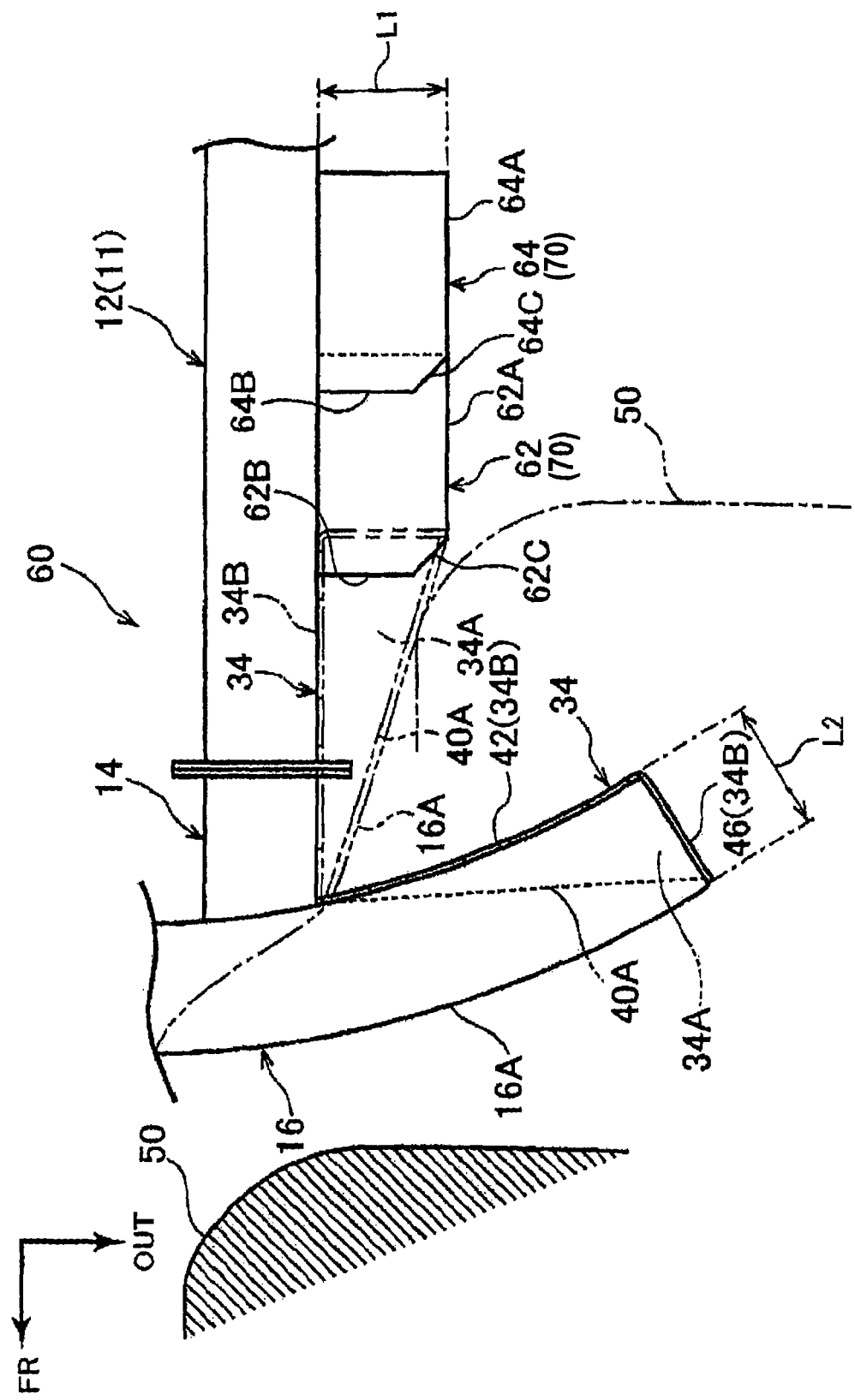

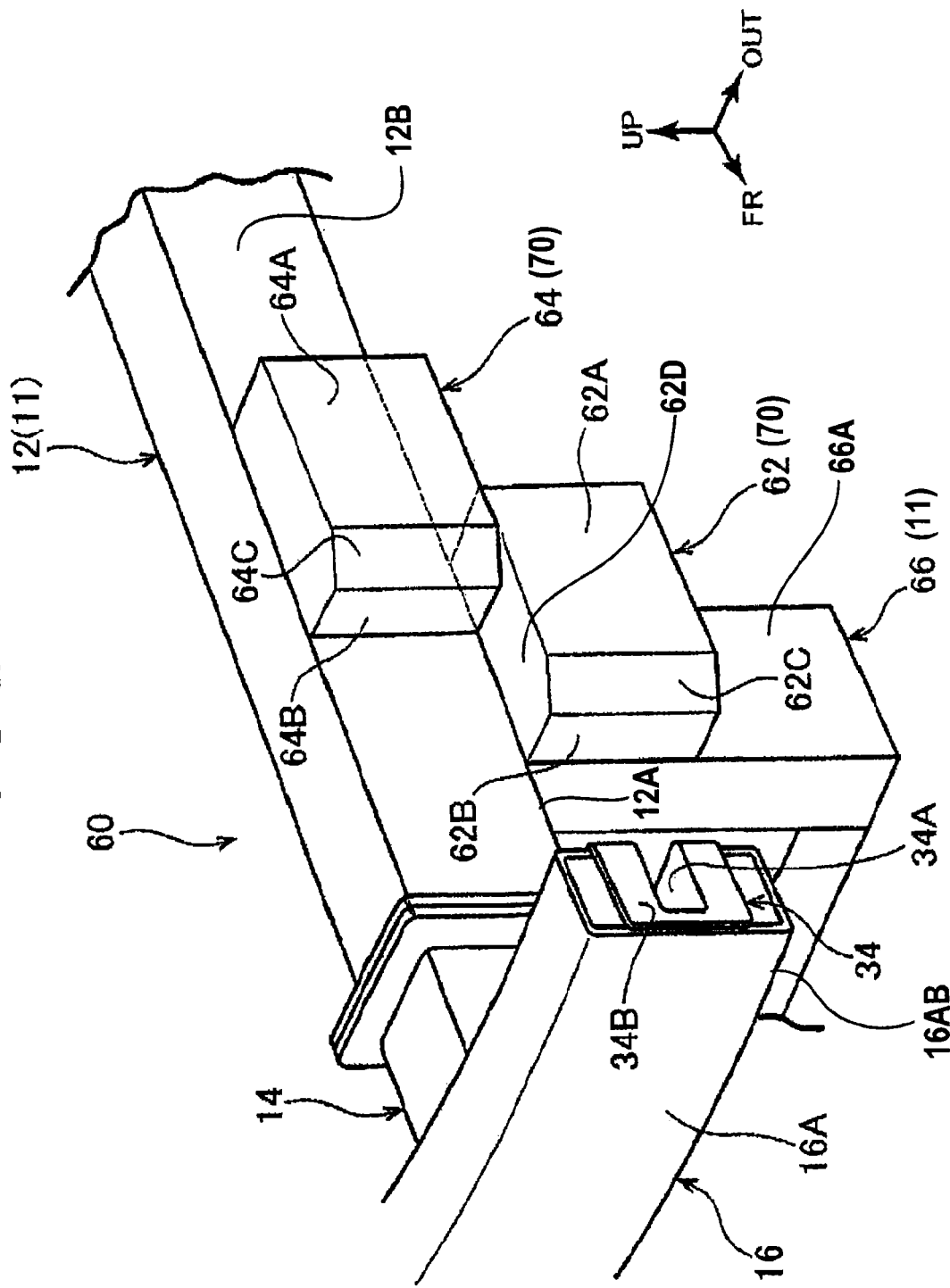

FRONT VEHICLE BODY STRUCTURE

CROSS REFERENCE TO RELATED APPLICATIONS

The present application is a divisional application of U.S. patent application Ser. No. 13/712,402, filed on Dec. 12, 2012, and claims priority to Japanese Patent Application No. 2011-272639, filed on Dec. 13, 2011. The entire contents of U.S. patent application Ser. No. 13/712,402 and Japanese Patent Application No. 2011-272639 are incorporated herein by reference.

BACKGROUND OF THE INVENTION

1. Field of the Invention

The present invention relates to a front vehicle body structure.

2. Description of Related Art

Japanese Patent Application Publication No. 2008-213739 (JP 2008-213739 A) describes below a vehicle front structure in which a reinforced extension is joined to a vehicle-width-direction outward end of a bumper reinforcement, and extends toward the rear direction of a vehicle body, that is, toward a front tire. The reinforced extension includes a projecting portion that is formed at its rear end portion and that projects toward a side member. At the time of a small overlap crash of a vehicle into a crashed object, the projecting portion contacts a front side member. Accordingly, the reinforced extension receives a counterforce from a vehicle-width-direction outward surface of the front side member. In addition, a stopper bracket is fixed to the front side member to prevent the projecting portion from being displaced toward the rear of the vehicle body. Therefore, crash energy is absorbed not only by bending deformation of the reinforced extension in the vehicle width direction, but also by cross-section crushing of the reinforced extension in the vehicle front-rear direction. This enhances crash energy absorption performance at the time of a small overlap crash.

Meanwhile, suppression of deformation of a vehicle body (particularly a cabin) is required for a small overlap crash.

SUMMARY OF THE INVENTION

An object of the present invention is to provide a front vehicle body structure that can suppress deformation of a vehicle body at the time of a small overlap crash.

A front vehicle body structure according to a first aspect of the present invention includes a front side member that is arranged on a side portion of a front vehicle body longitudinally in a vehicle front-rear direction, a bumper reinforcement that is arranged longitudinally in a vehicle width direction, that is connected directly or indirectly to a front end of the front side member, and that includes a protruding portion that protrudes more outward in the vehicle width direction than the front side member, and a high-strength member that is formed with a higher strength than the protruding portion, that is mounted to a rear-surface of the protruding portion, and that is formed such that a dimension in the vehicle front-rear direction is increased as the high-strength member extends more outward in the vehicle width direction.

In the first aspect of the invention, the high-strength member is formed with a higher strength than the protruding portion of the bumper reinforcement, and is mounted to the rear surface of the protruding portion. The high-strength member is formed such that its dimension in the vehicle front-rear direction is increased as the high-strength member extends more outward in the vehicle width direction. When a load is input from the front of the vehicle body to the protruding portion of the bumper reinforcement by a small overlap crash of a vehicle into a crashed object, the protruding portion is deformed toward the rear of the vehicle body along the front side member. As described above, in a state where the protruding portion is deformed toward the rear of the vehicle body along the front side member, the high-strength member is positioned such that its dimension in the vehicle width direction is increased as the high-strength member extends more toward the rear of the vehicle body, and an amount by which the high-strength member protrudes outward in the vehicle width direction is increased as the high-strength member extends more toward the rear of the vehicle body. Moreover, the high-strength member is formed with a higher strength than the protruding portion, and therefore can maintain its outline even after the protruding portion is deformed. Therefore, the crashed object moves rearward relative to the vehicle with the high-strength member interposed between the crashed object and the front side member, thereby applying a force directed toward one side in the vehicle width direction to the crashed object, while applying a counterforce directed toward the other side in the vehicle width direction to the front side member. This counterforce allows the vehicle to move toward the other side in the vehicle width direction, so that an amount of overlap between the crashed object and the vehicle in the vehicle width direction can be decreased, and accordingly deformation of the vehicle body can be suppressed.

According to the above first aspect, the front vehicle body structure may include an extension member that is formed with a higher strength than the protruding portion, that is fixed to a vehicle-width-direction outward surface of a vehicle body frame member configured by including the front side member, and that is arranged such that a front-end side of the extension member is vertically or longitudinally adjacent to a rear-end side of the high-strength member in a state where the protruding portion is deformed toward the rear of the vehicle body along the front side member by a load input from the front of the vehicle body.

In the above configuration, when the protruding portion of the bumper reinforcement is deformed toward the rear of the vehicle body along the front side member, a front end of the extension member fixed to the vehicle body frame member is vertically or longitudinally adjacent to the rear-end side of the high-strength member. The extension member is formed with a higher strength than the protruding portion similarly to the high-strength member. Therefore, the high-strength member is interposed between the crashed object and the front side member, and the extension member is further interposed between the crashed object and the vehicle body frame member, so that a counterforce that is directed toward the other side in the vehicle width direction (the side opposite to the crashed object) and that is applied to the vehicle body frame member can be generated for a more extended period of time. This allows the vehicle to effectively move toward the other side in the vehicle width direction, so that the amount of overlap between the crashed object and the vehicle in the vehicle width direction can be further decreased, and accordingly deformation of the vehicle body can be further suppressed.

According to the above configuration, the vehicle body frame member includes a radiator support lower cross that is connected to a lower surface of the front side member on its front-end side, and the extension member may include a first extension member that is fixed to a vehicle-width-direction outward surface of the radiator support lower cross and that is arranged such that a front-end side of the first extension member is positioned below the rear-end side of the high-strength member in a state where the protruding portion is deformed toward the rear of the vehicle body along the front side member by a load input from the front of the vehicle body.

In the above configuration, when the protruding portion of the bumper reinforcement is deformed toward the rear of the vehicle body along the front side member, the rear-end side of the high-strength member is arranged above the front-end-side of the first extension member fixed to the vehicle-width-direction outward surface of the radiator support lower cross. Therefore, the high-strength member can be interposed between the crashed object and the front side member, and immediately the first extension member can be interposed between the crashed object and the radiator support lower cross. This allows a counterforce that is directed toward the other side in the vehicle width direction and that is applied to the vehicle body frame member to be continuously generated, and therefore allows the vehicle to more effectively move toward the other side in the vehicle width direction. Moreover, the first extension member is fixed to the radiator support lower cross, and therefore such a simple configuration can prevent the protruding portion, which is deformed toward the rear of the vehicle body, from interfering with the first extension member.

According to the above configuration, the extension member may include a second extension member that is fixed to a vehicle-width-direction outward surface of the front side member with a front-end side of the second extension member arranged above a rear-end side of the first extension member.

In the above configuration, the second extension member is formed with a higher strength than the protruding portion of the bumper reinforcement, and is fixed to the vehicle-width-direction outward surface of the front side member with the front-end side of the second extension member arranged above the rear-end side of the first extension member. Therefore, the first extension member is interposed between the crashed object and the front side member, and immediately the second extension member is interposed therebetween, so that a counterforce that is directed toward the other side in the vehicle width direction and that is applied to the front side member (the vehicle body frame member) can be generated for a more extended period of time. This allows the vehicle to further effectively move toward the other side in the vehicle width direction.

According to the above configuration, a recessed portion that is open toward the rear of the vehicle body may be formed at a vertically intermediate portion of the bumper reinforcement, and the high-strength member may be fitted into the recessed portion.

In the above configuration, the high-strength member is fitted into the recessed portion formed at the vertically intermediate portion of the bumper reinforcement. This can prevent a space in the front vehicle body from being narrowed by a space where the high-strength member is arranged.

According to the above configuration, the high-strength member may be formed into an open cross-sectional shape that is open toward the rear of the vehicle body in a cross section taken along the vehicle front-rear direction.

In the above configuration, the high-strength member is formed into an open cross-sectional shape that is open toward the rear of the vehicle body, and therefore reduction in weight of the high-strength member can be achieved. Moreover, when the protruding portion of the bumper reinforcement is deformed toward the rear of the vehicle body, the high-strength member comes in contact with the front side member, so that the high-strength member and the vehicle body frame member can form a closed cross section. This can enhance the strength of the high-strength member at the time when the high-strength member receives a compressive load between the crashed object and the vehicle body frame member.

A front vehicle body structure according to a second aspect of the present invention includes a front side member that is arranged on a side portion of a front vehicle body longitudinally in a vehicle front-rear direction and a bumper reinforcement that is arranged longitudinally in a vehicle width direction, that is connected directly or indirectly to a front end of the front side member, that includes a protruding portion that protrudes more outward in a vehicle width direction than the front side member, and that is formed with a high-strength portion such that a dimension of the high-strength portion in the vehicle front-rear direction is increased as the high-strength portion extends more outward in the vehicle width direction, the high-strength portion being formed with a higher strength than the protruding portion and being provided on a rear-surface side of the protruding portion.

In the above second aspect, the high-strength portion is formed with a higher strength than the protruding portion of the bumper reinforcement, and is provided on the rear-surface of the protruding portion. The high-strength portion is formed such that its dimension in the vehicle front-rear direction is increased as the high-strength portion extends more outward in the vehicle width direction. When a load is input from the front of the vehicle body to the protruding portion of the bumper reinforcement by a small overlap crash of the vehicle into the crashed object, the protruding portion is deformed toward the rear of the vehicle body along the front side member. As described above, in a state where the protruding portion is deformed toward the rear of the vehicle body along the front side member, the high-strength portion is positioned such that its dimension in the vehicle width direction is increased as the high-strength member extends more toward the rear of the vehicle body, and an amount by which the high-strength portion protrudes outward in the vehicle width direction is increased as the high-strength portion extends more toward the rear of the vehicle body. Moreover, the high-strength portion is formed with a higher strength than the protruding portion, and therefore can maintain its outline even after the protruding portion is deformed. Therefore, the crashed object moves rearward relative to the vehicle with the high-strength portion interposed between the crashed object and the front side member, thereby applying a force directed toward one side in the vehicle width direction to the crashed object, while applying a counterforce directed toward the other side in the vehicle width direction to the front side member. This counterforce allows the vehicle to move toward the other side in the vehicle width direction, so that an amount of overlap between the crashed object and the vehicle in the vehicle width direction can be decreased, and accordingly deformation of the vehicle body can be suppressed.

As described above, the front vehicle body structure according to the aspects of the present invention can suppress deformation of a vehicle body at the time of a small overlap crash.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a plan view corresponding to FIG. 1 and illustrates a state where a protruding portion of a bumper reinforcement in the front vehicle body structure according to the first embodiment is deformed along a front side member;

FIG. 5 is a plan view of a front vehicle body structure according to a second embodiment of the present invention; and FIG. 6 is a perspective view of the front vehicle body structure according to the second embodiment.

DETAILED DESCRIPTION OF EMBODIMENTS

Figure 1:
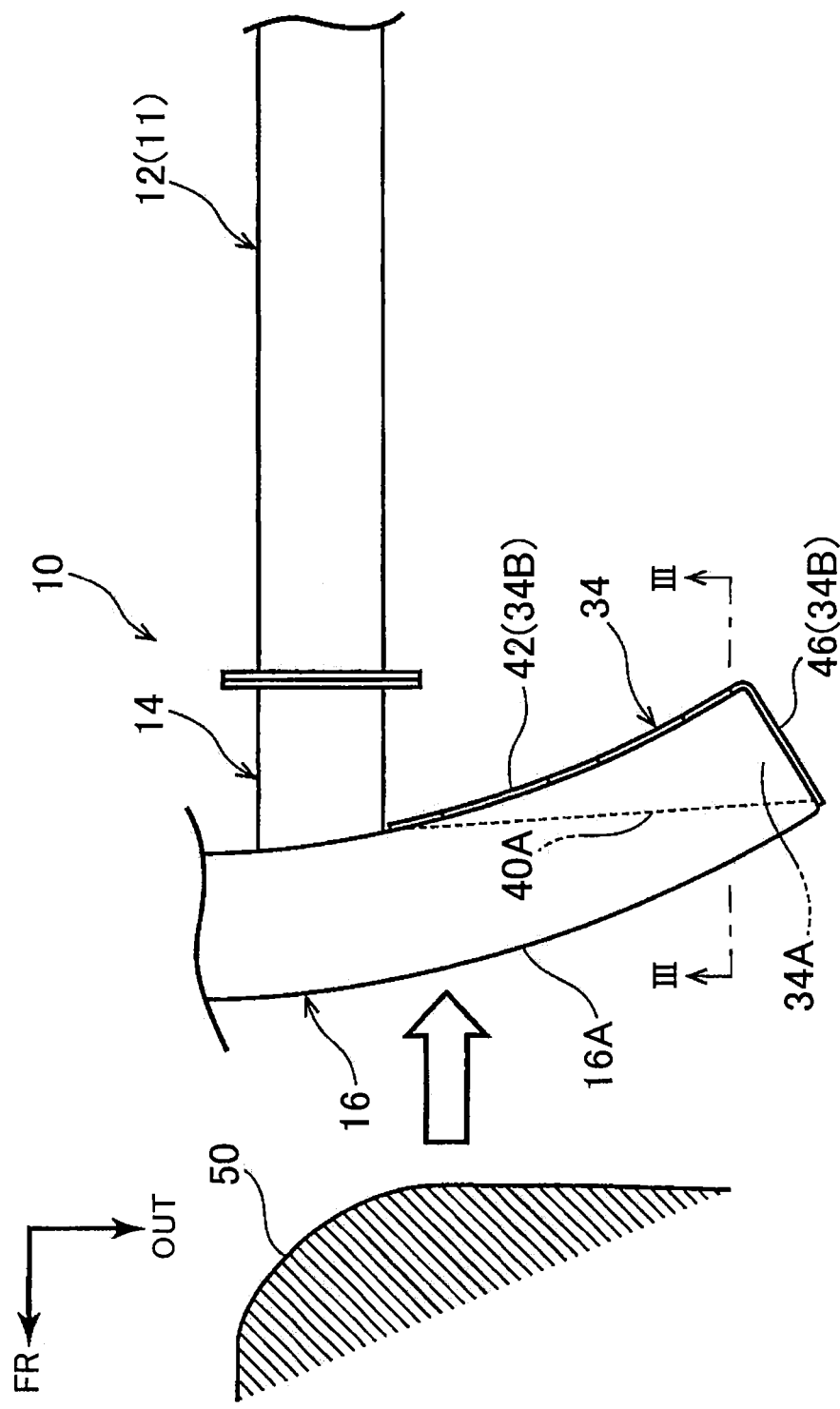
FIG. 1 is a plan view of a front vehicle body structure according to a first embodiment of the present invention.

A front vehicle body structure 10 according to a first embodiment of the present invention is hereinafter described with reference to FIGS. 1 to 4. In the drawings, the arrow FR indicates the front direction of a vehicle body, the arrow UP indicates the upward direction of the vehicle body, and the arrow OUT indicates the outward direction in the vehicle width direction. The terms "upward (downward) direction of the vehicle body," "front (rear) direction of the vehicle body," and "outward (inward) direction in the vehicle width direction" are hereinafter simply referred to as "upward (downward)," "front (rear)," and "outward (inward)," respectively.

Figure 2:
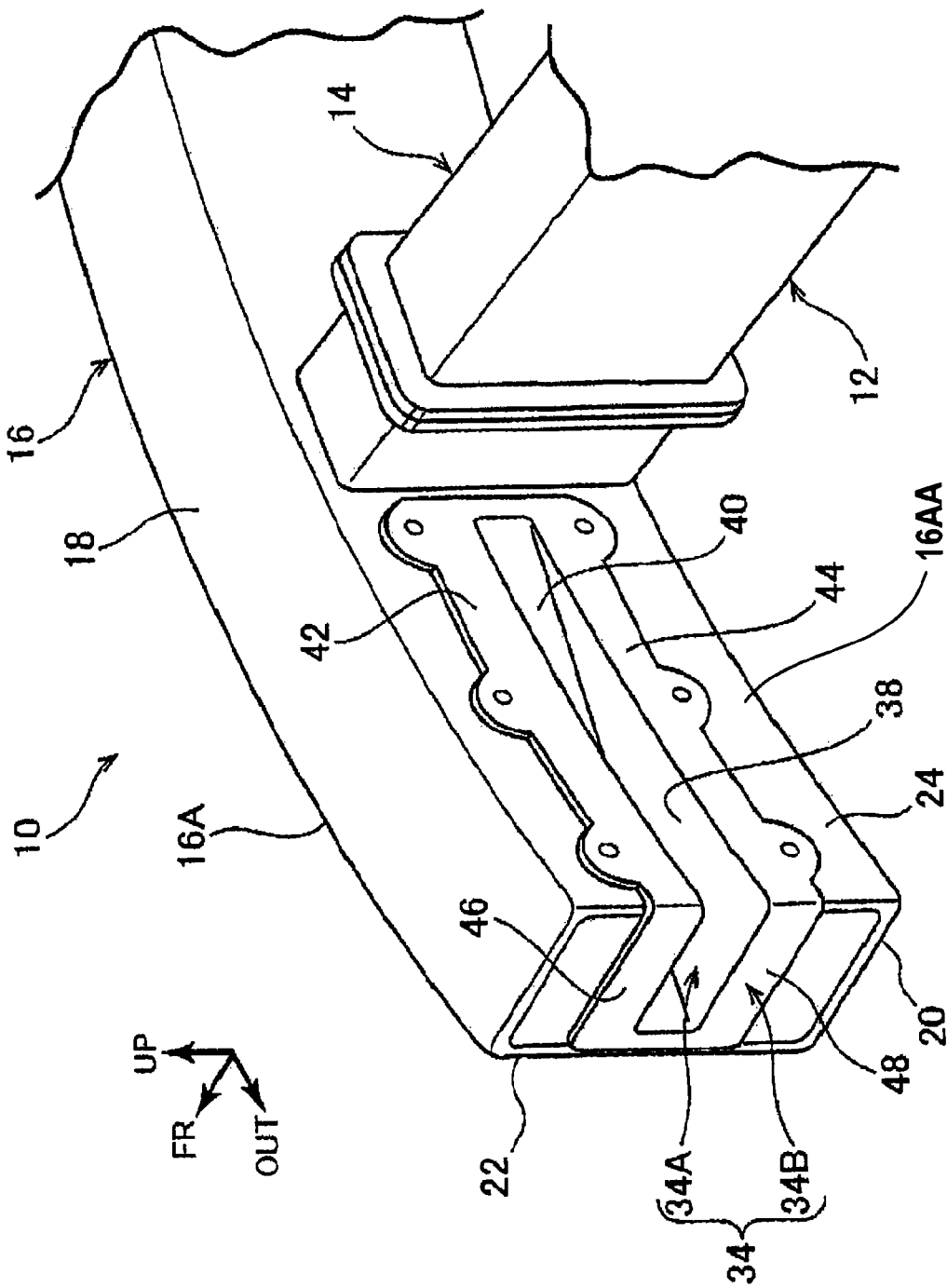
FIG. 2 is a perspective view of the front vehicle body structure according to the first embodiment.

As shown in FIGS. 1 and 2, the front vehicle body structure 10 according to the present embodiment includes a front side member 12. The front side member 12 is a component of a vehicle body frame member 11, and is arranged on each of side portions of a front vehicle body longitudinally in the front-rear direction. Because the front vehicle body structure 10 of the present invention has a laterally symmetrical configuration, a part of the front vehicle body structure 10, which is located on the central side and the right side of the vehicle body, is not shown in FIGS. 1 and 2.

Crash boxes 14 are connected to respective front ends of the left and right front side members 12 by bolt fastening. The left and right crash boxes 14 have a predetermined axial compressive load bearing strength lower than the front side members 12. When a frontal crash occurs to a vehicle, these crash boxes 14 are configured to be compressively deformed in an axial direction before the front side members 12 are compressively deformed in the axial direction in order to absorb crash energy.

Figure 3:
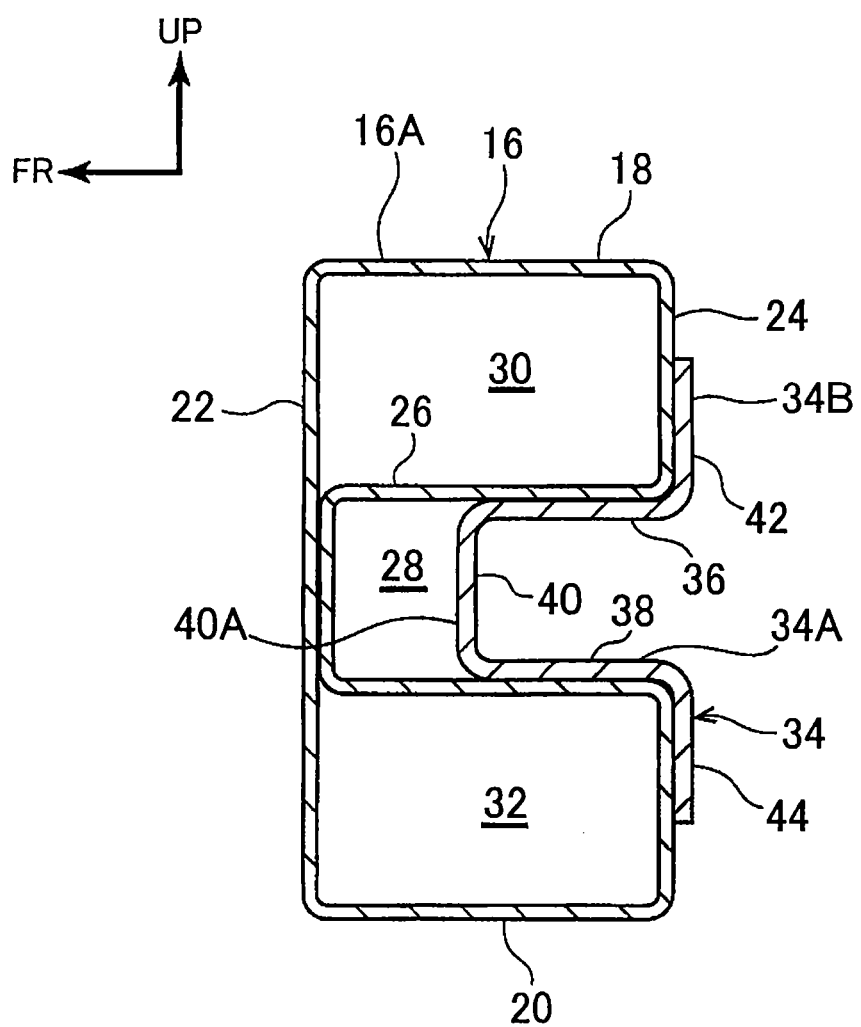
FIG. 3 is a vertical cross-sectional view that illustrates a cross section taken along the line III-III in FIG. 1.

A bumper reinforcement 16 is arranged longitudinally in the vehicle width direction, and is connected to the front ends of the left and right crash boxes 14 by bolt fastening. As shown in FIG. 3, the bumper reinforcement 16 is a so-called B-shaped cross-section type, and includes an upper wall 18, a lower wall 20, a front wall 22, and a rear wall 24. A bulging portion 26 that bulges toward the front into a generally U-shaped cross section is provided at a vertically intermediate portion of the rear wall 24. Therefore, a recessed portion 28 that is open toward the rear is formed at a vertically intermediate portion of the bumper reinforcement 16. On both upper and lower sides of the recessed portion 28, closed cross-sectional portions 30 and 32 are formed respectively.

The bumper reinforcement 16 includes left and right protruding portions 16A that respectively protrude more outward than the left and right crash boxes 14. The left and right protruding portions 16A are moderately curved toward the rear as these protruding portions 16A extend more outward. The protruding portions 16A have a lower surface 16AB and a predetermined length dimension in the curved direction (the longitudinal direction), which is sufficiently larger than the length dimension of the crash boxes 14 in the front-rear direction. A spacer 34 that serves as a high-strength member is mounted to a rear surface 16AA of each of these protruding portions 16A.

The spacer 34 is formed by pressing a sheet metal material into an elongated shape, for example, and is arranged longitudinally along the longitudinal direction of the protruding portion 16A. The spacer 34 includes a body portion 34A that is fitted into the recessed portion 28 of the protruding portion 16A, and a flange portion 34B that extends from a rear end of the body portion 34A and from an outward end of the body portion 34A toward the opposite sides in the upward-downward direction. As shown in FIG. 3, the spacer 34 is formed generally into a hat cross-sectional shape that is open toward the rear in a cross section taken along the front-rear direction.

The body portion 34A includes an upper wall 36 and a lower wall 38 that are opposed to each other in the upward-downward direction, and a vertical wall 40 that connects between front ends of the upper wall 36 and the lower wall 38 in the upward-downward direction. The body portion 34A is formed generally into a U shape that is open toward the rear in a cross section taken along the front-rear direction. The flange portion 34B includes a rear-surface upper flange 42 that extends upward from the rear end of the upper wall 36, a rear-surface lower flange 44 that extends downward from the rear end of the lower wall 38, a side-surface upper flange 46 that extends upward from an outward end of the upper wall 36, and a side-surface lower flange 48 that extends downward from an outward end of the lower wall 38. The rear-surface upper flange 42 and the rear-surface lower flange 44 are fixed to a rear surface of the rear wall 24 in the protruding portion 16A by bolt fastening, for example. A method of fixing the spacer 34 to the protruding portion 16A is not limited to the above method, and can be appropriately changed.

As shown in FIG. 1, the body portion 34A is formed into a wedge shape (generally a right triangle shape) in a plan view, and is formed such that the dimension in the front-rear direction is larger (gradually increased) as the body portion 34A extends more outward. Specifically, the dimension of the body portion 34A in a direction in which the front wall 22 and the rear wall 24 face each other (that is, the depth of the spacer 34 in a U-shaped cross section) is maximized at the outward end of the protruding portion 16A. The vertical wall 40 of the body portion 34A is arranged close to the front wall 22 of the protruding portion 16A. In addition, the dimension of the body portion 34A in a direction in which the front wall 22 and the rear wall 24 face each other is gradually decreased as the body portion 34A extends more inward, and is almost zero at an inward end of the body portion 34A, which is arranged close to the crash box 14. In the body portion 34A, the vertical wall 40 includes a front surface 40A arranged generally along the vehicle width direction.

The above spacer 34 is formed with a higher strength than the protruding portion 16A of the bumper reinforcement 16, and is configured to have a higher compressive load bearing strength than the protruding portion 16A. A material of the spacer 34 is not limited to sheet metal, and can be appropriately changed. However, the spacer 34 is preferably formed with a high strength that can bear a load of approximately 100 kN in its longitudinal direction and in its width direction (a direction in which the front wall 22 and the rear wall 24 face each other). The spacer 34 is designed to suppress deformation of the vehicle body when a small overlap crash occurs to the vehicle. The small overlap crash refers to a crash mode in which the vehicle crashes into a crashed object 50 (a barrier) with a small amount of overlap between the crashed object 50 and the vehicle in the vehicle width direction, as shown in FIG. 1, and therefore crash energy is not sufficiently absorbed by axial compressive deformation of the front side members 12.

In the front vehicle body structure 10 configured as described above, an absorber (not shown) is mounted to a front end surface of the above bumper reinforcement 16, while the absorber and the bumper reinforcement 16 are covered by a bumper cover (not shown) from the front side and from the opposite sides in the vehicle width direction.

Now, functions and effects of the present embodiment are described.

In the front vehicle body structure 10 configured as described above, when a load is input from the front to the protruding portion 16A of the bumper reinforcement 16 by a small overlap crash of the vehicle into the crashed object 50, the protruding portion 16A is deformed (bent) toward the rear along the front side member 12, as shown in FIG. 4, and the spacer 34 mounted to the rear surface of the protruding portion 16A comes in contact with an outward surface of the front side member 12. The spacer 34 is formed such that its dimension in the front-rear direction is increased as the spacer 34 extends more outward in a state before the protruding portion 16A is deformed. Therefore, in a state after the protruding portion 16A is deformed, the spacer 34 is in contact with the outward surface 12B of the front side member 12 at a position at which the dimension of the spacer 34 in the vehicle width direction is increased as the spacer 34 extends more toward the rear (as shown in FIG. 4).

In this state, an amount by which the spacer 34 protrudes from the outward surface of the front side member 12 is increased as the space 34 extends more toward the rear, and the front surface 40A of the vertical wall 40 of the spacer 34 is inclined outward as the front surface 40A extends more toward the rear. Moreover, the spacer 34 is formed with a higher strength than the protruding portion 16A, and therefore can maintain its outline even after the protruding portion 16A is deformed.

Therefore, the crashed object 50 moves rearward relative to the vehicle with the spacer 34 interposed between the crashed object 50 and the front side member 12 (with the spacer 34 and the protruding portion 16A interposed between the bumper cover and the absorber (both not shown) and the front side member 12). Accordingly, a force directed toward one side in the vehicle width direction is applied to the crashed object 50 (the crashed object 50 receives a force directed toward one side in the vehicle width direction from the front surface 40A of the spacer 34). Therefore, a counterforce F directed toward the other side in the vehicle width direction is applied to the front side member 12 through the spacer 34. The counterforce F allows the front side member 12 to be effectively deformed toward the other side in the vehicle width direction, while allowing the vehicle to move toward the other side in the vehicle width direction. Accordingly, the amount of overlap between the crashed object 50 and the vehicle in the vehicle width direction can be decreased, so that deformation of the vehicle body can be suppressed. Particularly, in a vehicle (such as a sedan) in which a cabin is provided at the center in the front-rear direction, a load input to the cabin can be reduced so that deformation of the cabin can be effectively suppressed.

In the present embodiment, the above spacer 34 is fitted into the recessed portion 28 formed at the vertically intermediate portion of the bumper reinforcement 16. This can prevent a space in the front vehicle body from being narrowed by a space where the spacer 34 is arranged.

In addition, in the present embodiment, the spacer 34 is formed into an open cross-sectional shape that is open toward the rear. Therefore, reduction in weight of the spacer 34 can be achieved. Moreover, the spacer 34, together with the front side member 12, form a closed cross section in a state where a protruding portion of a bumper reinforcement is deformed toward the rear and consequently the spacer 34 is in contact with the outward surface of the front side member 12. This can enhance the strength of the spacer 34 at the time when the spacer 34 receives a compressive load between the crashed object 50 and the front side member 12.

Now, a second embodiment of the present invention is described. Basically, like numerals denote like elements and functions between the first and second embodiments, and descriptions thereof are not repeated.

A front vehicle body structure 60 according to the second embodiment of the present invention is shown in a plan view in FIG. 5. The front vehicle body structure 60 is also shown in a perspective view in FIG. 6. Although the present embodiment is basically configured in the same manner as the first embodiment, the present embodiment has a feature in that a first extension spacer 62 that serves as a first extension member and a second extension spacer 64 that serves as a second extension member are added. The first extension spacer 62 and the second extension spacer 64 may be regarded as an extension member 70. The first extension spacer 62 is formed of the same material as the spacer 34 into a block shape, and has a strength equal to the strength of the spacer 34. The first extension spacer 62 is fixed to an outward surface of a radiator support lower cross 66 (not shown in FIG. 2) connected to a lower surface 12A of the front side member 12 on its front-end side. The first extension spacer 62 includes an outward surface 62A, a front surface 62B, an inclined surface 62C formed between the outward surface 62A and the front surface 62B, and an upper surface 62D. The inclined surface 62C is formed to be inclined more inwardly as the inclined surface 62C extends more toward the front. In a state where the protruding portion 16A is deformed toward the rear along the front side member 12 (see chain double-dashed lines in FIG. 5), the first extension spacer 62 is arranged such that its front end is positioned near and below the rear end of the spacer 34. The radiator support lower cross 66, together with the front side member 12, configure the vehicle body frame member 11.

In contrast, the second extension spacer 64 is basically configured in the same manner as the first extension spacer 62, and is fixed to the outward surface of the front side member 12 with a front end of the second extension spacer 64 arranged near and above a rear end of the first extension spacer 62. The second extension spacer 64 includes an outward surface 64A, a front surface 64B, and an inclined surface 64C formed between the outward surface 64A and the front surface 64B. The inclined surface 64C is formed to be inclined more inwardly as the inclined surface 64C extends more toward the front.

The first extension spacer 62 and the second extension spacer 64 have the same predetermined width dimension L1 in the vehicle width direction. The outward surface 62A of the first extension spacer 62 and the outward surface 64A of the second extension spacer 64 are arranged on the same plane. The predetermined width dimension L1 is equal to a width dimension L2 of an outward end of the spacer 34. Therefore, in a state where the protruding portion 16A is deformed toward the rear along the front side member 12 and consequently the spacer 34 is in contact with the front side member 12 (see the chain double-dashed lines in FIG. 5), a rear end of the front surface 40A of the spacer 34 and the outward surface 62A of the first extension spacer 62 are arranged almost at the same position in the vehicle width direction. In this state, in a plan view shown in FIG. 5, the first extension spacer 62 and the second extension spacer 64 are arranged such that the first extension spacer 62 extends from the spacer 34 toward the rear, while the second extension spacer 64 extends from the first extension spacer 62 toward the rear.

A rigid fixing method such as bolt fastening and welding is preferably used as a method of fixing the first extension spacer 62 to the radiator support lower cross 66 and as a method of fixing the second extension spacer 64 to the front side member 12. However, the fixing method is not limited to a particular method.

In the present embodiment, when the protruding portion 16A of the bumper reinforcement 16 is deformed toward the rear by a load input from the crashed object 50 and consequently the spacer 34 comes in contact with the outward surface of the front side member 12, the rear end of the spacer 34 is arranged near and above the front end of the first extension spacer 62 fixed to an outward surface 66A of the radiator support lower cross 66. The first extension spacer 62 is also formed with a higher strength than the protruding portion 16A similarly to the spacer 34. Therefore, the spacer 34 is interposed between the crashed object 50 and the front side member 12, and immediately the first extension spacer 62 is interposed between the crashed object 50 and the front side member 12, so that the counterforce F that is directed toward the other side in the vehicle width direction and that is applied to the front side member 12 can be continuously generated. This allows the vehicle to effectively move toward the other side in the vehicle width direction (the side opposite to the crashed object 50), so that the amount of overlap between the crashed object 50 and the vehicle in the vehicle width direction can be further decreased, and accordingly deformation of the vehicle body can be further suppressed.

Moreover, in the present embodiment, the second extension spacer 64 is formed with a higher strength than the protruding portion 16A of the bumper reinforcement 16, and is fixed to the outward surface of the front side member 12 with the front end of the second extension spacer 64 arranged near and above the rear end of the first extension spacer 62. Therefore, the first extension spacer 62 is interposed between the crashed object 50 and the front side member 12, and immediately the second extension spacer 64 is interposed between the crashed object 50 and the front side member 12, so that the counterforce F that is directed toward the other side in the vehicle width direction and that is applied to the front side member 12 can be generated for a more extended period of time. This allows the vehicle to more effectively move toward the other side in the vehicle width direction, so that the amount of overlap between the crashed object 50 and the vehicle in the vehicle width direction can be further decreased, and accordingly deformation of the vehicle body can be further suppressed.

In the present embodiment, the first extension spacer 62 is fixed to the radiator support lower cross 66, and therefore such a simple configuration can prevent the protruding portion 16A, which is deformed toward the rear, from interfering with the first extension spacer 62. The first extension spacer 62 and the second extension spacer 64 include the inclined surface 62C and the inclined surface 64C, respectively. This can prevent or suppress application of an impact to the vehicle body, when the crashed object 50 comes in sliding contact with the first extension spacer 62 and the second extension spacer 64.

In the second embodiment, the case where an extension member includes the first extension spacer 62 (the first extension member) fixed to the radiator support lower cross 66 and the second extension spacer 64 (the second extension member) fixed to the front side member 12 has been described. However, the present invention is not limited to this case, and a configuration of the extension member can be appropriately changed. For example, the first extension member and the second extension member may be formed integrally with each other. Also for example, in the second embodiment, the first extension member 62 may be omitted, and the front end of the second extension member 64 may be longitudinally close to and adjacent to (aligned with) the rear end of the spacer 34 shown in the chain double-dashed lines in FIG. 5.

In the second embodiment, the first extension spacer 62 (the first extension member) is fixed to the radiator support lower cross 66. However, the present invention is not limited thereto. For example, in a vehicle (such as an electric vehicle) that does not include any radiator, a first extension member is fixed to another frame member connected to a front side member.

In the above embodiments, the spacer 34 (the high-strength member) is formed into an open cross-sectional shape that is open toward the rear, when viewed from the vehicle width direction. However, the present invention is not limited thereto, and the shape of the high-strength member can be appropriately changed. For example, the high-strength member may be formed into a closed cross-sectional shape, when viewed from the vehicle width direction.

In the above embodiments, the spacer 34 is fitted into the recessed portion 28 formed in the bumper reinforcement 16. However, the present invention it not limited thereto, and in a case where a bumper reinforcement does not include any recessed portion, a high-strength member may be mounted to either one or both of an upper-surface side and a lower-surface side of the bumper reinforcement.

In the above embodiments, the bumper reinforcement 16 is connected to the front end of the front side member 12 through the crash box 14. However, the present invention is not limited thereto, and a bumper reinforcement may be directly connected to a front end of a front side member.

In the above embodiments, the protruding portion 16A is deformed toward the rear along the front side member 12, and consequently the spacer 34 comes in contact with the front side member 12. However, the present invention is not limited thereto, and a high-strength member may not come into direct contact with a front side member, and a separate member (for example, a part of a protruding portion) may be interposed between the high-strength member and the front side member.

In the above embodiments, the front surface 40A of the spacer 34 is formed into a flat surface. However, the present invention is not limited thereto, and a front surface of a high-strength member may be formed into a curved surface.

Further, in the above embodiments, the spacer 34, separately formed from the bumper reinforcement 16, is mounted to the protruding portion 16A of the bumper reinforcement 16. However, the present invention is not limited thereto, and a bumper reinforcement may be integrally provided with a high-strength portion that has a higher strength than a protruding portion of the bumper reinforcement on a rear-surface side of the protruding portion.

Various other changes may also be made to the present invention without departing from the gist thereof. It should be understood that the scope of right of the present invention is not limited to the above embodiments.

What is claimed is:

1. A front vehicle body structure comprising:
a front side member that constitutes a side portion of the front vehicle body structure and is arranged longitudinally in a vehicle front-rear direction;
a bumper reinforcement that is arranged longitudinally in a vehicle width direction and is connected directly or indirectly to a front end of the front side member, the bumper reinforcement including a protruding portion that protrudes more outward in the vehicle width direction than the front side member, and a high-strength member that has a higher strength than a strength of the protruding portion, the high-strength member being disposed at a rear-surface side of the protruding portion; and
an extension member that has a higher strength than the strength of the protruding portion, that is fixed to an outer surface of the front side member in the vehicle width direction, and that is arranged rearward of the high-strength member, and wherein the extension member is apart from a rear surface of the high-strength member in the vehicle front-rear direction.

2. The front vehicle body structure according to claim 1, wherein
the bumper reinforcement is overlapped with the extension member when viewed from a front side of the front vehicle body structure.

3. The front vehicle body structure according to claim 2, wherein
an end portion of the high-strength member is located in front of the extension member when the bumper reinforcement is deformed rearward and the high-strength member is in contact with front side member.

4. The front vehicle body structure according to claim 1, wherein
the extension member is arranged below the front side member, and
a distance from a connecting portion between the front side member and the bumper reinforcement to a front end of the extension member is shorter than a distance from the connecting portion to an outer end of a rear surface of the protruding portion,
the outer end being disposed outside in the vehicle width direction.

5. The front vehicle body structure according to claim 1, wherein at least a portion of the high-strength member extends into a recessed portion in the protruding portion.

6. The front vehicle body structure according to claim 1, wherein an outer surface of the extension member in the vehicle width direction includes an inclined surface that inclines going in a direction from a vehicle front to a vehicle rear.

* * * * *